(No Model.)
W. A. SCHLEICHER.
SNAP HOOK.
No. 544,126.   Patented Aug. 6, 1895.
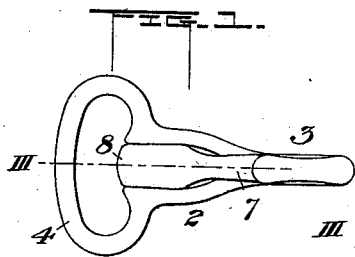
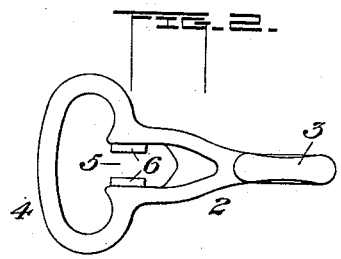
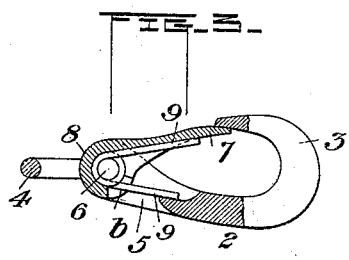
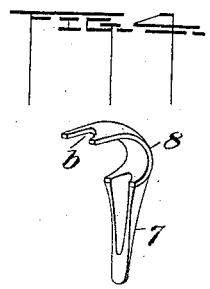
WITNESSES
S. Victor King
N. B. Corwin
INVENTOR
William A. Schleicher
by his Attorneys
W. Bakewell & Sons

UNITED STATES PATENT OFFICE.

WILLIAM A. SCHLEICHER, OF CLEVELAND, OHIO.

SNAP-HOOK.

SPECIFICATION forming part of Letters Patent No. 544,126, dated August 6, 1895.

Application filed March 2, 1895. Serial No. 540,318. (No model.)

*To all whom it may concern:*

Be it known that I, WILLIAM A. SCHLEICHER, of Cleveland, in the county of Cuyahoga and State of Ohio, have invented a new and useful Improvement in Snap-Hooks, of which the following is a full, clear, and exact description, reference being had to the accompanying drawings, in which—

Figure 1 is a plan view of the snap-hook. Fig. 2 is a like view without the tongue. Fig. 3 is a side view, partly in section, on the line III III of Fig. 1. Fig. 4 is a perspective view of the tongue before the hub has been bent into annular form.

In the drawings, 2 represents the body portion of the snap-hook, having a hook 3, a strap-loop 4, and a bifurcated portion 5 at its butt, having on the inner faces of its legs short inwardly-projecting studs 6, which constitute the pivots on which the tongue 7 turns. Said tongue has a hub portion 8, which in fitting it to the hook is bent into circular form around the studs. It thus forms a socket for receiving the central coil of a V-shaped spring 9, and to accommodate the legs of the spring the inner side of the shank of the hook and the inner side of the tongue are grooved, and there is a notch $b$ formed in the tongue-socket. The spring-cavity thus formed by the hub portion 8, the notch $b$, and the grooves last mentioned flares in width outwardly from the hub portion of the tongue, and at its throat is large enough to permit passage of the coil of the spring. The spring which fits therein as shown in Fig. 3, is not confined by pintles or otherwise, for the studs 6 do not project inwardly far enough to enter the coil of the spring, but the spring is held merely by opposite pressure of its legs against the tongue and hook-shank, and can be removed and inserted readily. It is this facility of removing the spring and replacing it when broken or damaged that distinguishes my snap-hook from prior devices and renders it of very great utility, for in prior hooks the spring has been confined by fitting of the pins within the spring-coil or by encircling of the spring-coil by the hub of the tongue.

The form and construction of the parts of the hook may be changed in various ways without departure from my invention as defined in the claim, since

What I claim is—

A snap hook having a tongue, the butt of which is curved so as to form a hub encircling pintles in a bifurcated shank, said hub having a throat or opening sufficiently large to permit insertion of the coil of a V-shaped spring, and a V-shaped spring having a central coil set within the hub but unconfined therein; substantially as described.

In testimony whereof I have hereunto set my hand.

WILLIAM A. SCHLEICHER.

Witnesses:
 L. CHRISTIE,
 EMIL W. JAITE.